United States Patent
Miyabata et al.

(10) Patent No.: US 10,224,553 B2
(45) Date of Patent: Mar. 5, 2019

(54) FUEL CELL COMPRISING CONNECTION MEMBERS HAVING DIFFERENT THICKNESS FOR EACH OF CELL UNITS AND METHOD FOR MANUFACTURING SAME

(71) Applicant: NGK SPARK PLUG CO., LTD., Nagoya-shi, Aichi (JP)

(72) Inventors: Kenji Miyabata, Ise (JP); Hideki Ishikawa, Ichinomiya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 186 days.

(21) Appl. No.: 14/766,271

(22) PCT Filed: Feb. 5, 2014

(86) PCT No.: PCT/JP2014/052655
§ 371 (c)(1),
(2) Date: Aug. 6, 2015

(87) PCT Pub. No.: WO2014/123150
PCT Pub. Date: Aug. 14, 2014

(65) Prior Publication Data
US 2015/0372318 A1 Dec. 24, 2015

(30) Foreign Application Priority Data
Feb. 7, 2013 (JP) .................. 2013-022358

(51) Int. Cl.
*H01M 8/24* (2016.01)
*H01M 8/0202* (2016.01)
(Continued)

(52) U.S. Cl.
CPC ....... *H01M 8/0202* (2013.01); *H01M 8/0247* (2013.01); *H01M 8/0273* (2013.01);
(Continued)

(58) Field of Classification Search
CPC ............. H01M 8/0202; H01M 8/0247; H01M 8/0289; H01M 8/2425; H01M 8/248; Y02P 70/56
See application file for complete search history.

(56) References Cited

U.S. PATENT DOCUMENTS

2007/0029368 A1* 2/2007 Kubouchi ............ H01G 9/0029
228/112.1
2009/0239121 A1 9/2009 Ono
(Continued)

FOREIGN PATENT DOCUMENTS

CN 101223664 A 7/2008
JP 2000077080 A 3/2000
(Continued)

OTHER PUBLICATIONS

ISR (PCTISA210) dated Apr. 1, 2014, in related International Application No. PCT/JP2014/052655.
(Continued)

*Primary Examiner* — Raymond Alejandro
(74) *Attorney, Agent, or Firm* — Sughrue Mion, PLLC

(57) ABSTRACT

A fuel cell according to one mode includes a plurality of stacked cell units, each cell unit including at least an electrically conductive interconnector having a front surface and a back surface; a pair of connection members which are electrically connected to the interconnector; a single cell which includes an anode, a cathode, and an electrolyte therebetween and which is electrically connected to the connection members; and a separator having an opening which is connected to an outer peripheral portion of the single cell, the cell units being clamped together in a stacking direction, wherein the connection member on an anode side or a cathode side of the single cell of at least one cell unit of the cell units has a thickness different from that (Continued)

of the connection member on the anode side or the cathode side of the single cell of another cell unit.

7 Claims, 9 Drawing Sheets

(51) Int. Cl.
| | |
|---|---|
| H01M 8/0273 | (2016.01) |
| H01M 8/2404 | (2016.01) |
| H01M 8/242 | (2016.01) |
| H01M 8/2425 | (2016.01) |
| H01M 8/248 | (2016.01) |
| H01M 8/0247 | (2016.01) |
| H01M 8/0289 | (2016.01) |

(52) U.S. Cl.
CPC ......... *H01M 8/0289* (2013.01); *H01M 8/242* (2013.01); *H01M 8/2404* (2016.02); *H01M 8/248* (2013.01); *H01M 8/2425* (2013.01); *Y02P 70/56* (2015.11)

(56) References Cited

U.S. PATENT DOCUMENTS

| | | |
|---|---|---|
| 2009/0297904 A1 | 12/2009 | Rozumek et al. |
| 2010/0055525 A1 | 3/2010 | Uematsu et al. |
| 2010/0055531 A1 | 3/2010 | Ohmori et al. |
| 2011/0171554 A1* | 7/2011 | Hayashi ................ H01M 8/12 429/456 |
| 2012/0000964 A1* | 1/2012 | Sigler ................... H01M 2/206 228/111.5 |
| 2014/0051009 A1 | 2/2014 | Ohno et al. |
| 2014/0212784 A1 | 7/2014 | Okuyama et al. |

FOREIGN PATENT DOCUMENTS

| | | |
|---|---|---|
| JP | 2001143741 A | 5/2001 |
| JP | 2005203283 A | 7/2005 |
| JP | 2005317241 A | 11/2005 |
| JP | 2005317291 A | 11/2005 |
| JP | 2006260994 A | 9/2006 |
| JP | 2007035498 A | 2/2007 |
| JP | 2007250281 A | 9/2007 |
| JP | 2008293843 A | 12/2008 |
| JP | 2010080428 A | 4/2010 |
| JP | 2011008959 A | 1/2011 |
| JP | 2012028092 A | 2/2012 |
| WO | 2008041593 A1 | 4/2008 |
| WO | 2012/153446 A1 | 11/2012 |
| WO | 2013001777 A1 | 1/2013 |

OTHER PUBLICATIONS

Written Opinion (PCTISA237) dated Apr. 1, 2014, in related International Application No. PCT/JP2014/052655.

Extended European Search Report dated Sep. 30, 2016, by the European Patent Office in counterpart European Application No. 14748621.1.

Office Action dated Sep. 1, 2016, by the State Intellectual Property Office of P.R. China in counterpart Chinese Application No. 201480008062.5.

* cited by examiner

FUEL CELL COMPRISING CONNECTION MEMBERS HAVING DIFFERENT THICKNESS FOR EACH OF CELL UNITS AND METHOD FOR MANUFACTURING SAME

This is a National Stage of International Application No. PCT/JP2014/052655, filed Feb. 5, 2014, claiming priority based on Japanese Patent Application No. 2013-022358, filed Feb. 7, 2013, the contents of all of which are incorporated herein by reference in their entirety.

TECHNICAL FIELD

The present invention relates to a fuel cell and to a production method therefor.

BACKGROUND ART

There has been known a solid oxide fuel cell employing a solid electrolyte (solid oxide) (hereinafter the cell may be referred to as an "SOFC"). Such an SOFC employs, as a cell unit, for example, a single cell which is formed of a solid electrolyte layer, an anode provided on one surface of the electrolyte layer, and a cathode provided on the other surface of the electrolyte layer. For achievement of desired electric power, a fuel cell stack (fuel cell) is produced by stacking cell units each including such a single cell and an interconnector (current collection plate).

Regarding a fuel cell having such a stacking structure, particularly, there has been disclosed a technique for improving electrical connection in a fuel cell stack (see Patent Document 1 or 2).

Patent Document 1 describes a technique for reducing the contact resistance between a membrane electrode assembly and a current collector by providing a pressure member between a cover plate and a plate-like body.

Patent Document 2 describes a technique for reducing contact resistance through application of a clamping force by means of a washer plate and a disc spring.

PRIOR ART DOCUMENT

Patent Document

Patent Document 1: Japanese Patent Application Laid-Open (kokai) No. 2011-008959
Patent Document 2: Japanese Patent Application Laid-Open (kokai) No. 2001-143741

SUMMARY OF THE INVENTION

Problems to be Solved by the Invention

The technique described in Patent Document 1 or 2 is intended to reduce contact resistance (to improve electrical connection) through adjustment of clamping pressure in a fuel cell stack.

However, members forming the fuel cell stack generally have non-uniform thicknesses. Thus, when the members having non-uniform thicknesses are stacked together, contact resistance is not necessarily reduced satisfactorily even through application of clamping pressure.

In view of the foregoing, an object of the present invention is to provide a fuel cell which readily realizes a reduction in contact resistance. Another object of the present invention is to provide a method for producing the fuel cell.

Means for Solving the Problems

1. "Fuel Cell"

(1) One mode of the present invention is a fuel cell comprising a plurality of stacked cell units, each cell unit comprising at least an electrically conductive interconnector having a front surface and a back surface; a connection member which is electrically connected to the interconnector; a single cell which includes an anode, an electrolyte, and a cathode, and which is electrically connected to the connection member; and a separator having an opening which is connected to an outer peripheral portion of the single cell, the cell units being clamped together in a stacking direction, the fuel cell being characterized in that the connection member of at least one cell unit of the cell units has a thickness different from that of the connection member of another cell unit.

Since the connection member of at least one cell unit of the cell units has a thickness different from that of the connection member of another cell unit; i.e., the connection members, each being provided between the corresponding interconnectors, have different thicknesses, even when the single cells have non-uniform thicknesses, contact resistance can be reduced in the fuel cell (e.g., between the connection member and the single cell).

The fuel cell may further comprise a clamping member for clamping a plurality of the cell units in a stacking direction.

When clamping pressure applied to the cell units is adjusted by means of the clamping member, contact resistance can be readily controlled in the fuel cell (e.g., between a current collection member and the single cell).

The aforementioned fuel cell of the present invention may satisfy either or both of the following conditions (i) and (ii):

(i) the connection member (on the anode side of the single cell) of at least one cell unit of the cell units has a thickness different from that of the connection member (on the anode side of the single cell) of another cell unit; and (ii) the connection member (on the cathode side of the single cell) of at least one cell unit of the cell units has a thickness different from that of the connection member (on the cathode side of the single cell) of another cell unit.

(2) Preferably, the fuel cell is characterized in that a relation of "$0 \leq (D2-D1) \leq 200$ µm" is satisfied, wherein D1 represents the shortest distance between the front surface of the interconnector of one cell unit and the back surface of the interconnector of another cell unit stacked on the one cell unit, and D2 represents the sum of the thickness of the connection member of the one cell unit and the thickness of the single cell of the one cell unit.

As used herein, the "shortest distance D1" between the front surface of the interconnector of one cell unit and the back surface of the interconnector of another cell unit stacked on the one cell unit corresponds to the distance between the interconnectors of the cell units clamped together in a stacking direction (i.e., the distance between the front surface of the interconnector of the cell unit and the back surface of the interconnector of the adjacent cell unit).

Since the shortest distance D1 between the interconnectors and the sum thickness D2 of the thickness of the connection member of the one cell unit and the thickness of the single cell of the one cell unit satisfy a specific relation of "$0 \leq (D2-D1) \leq 200$ µm," when, for example, a plurality of the cell units are stacked together to thereby produce a fuel cell stack, the contact resistance between the connection member and the single cell can be reduced.

(2a) Preferably, the fuel cell is characterized in that a relation of "0≤(D20−D10)≤200 μm" is satisfied, wherein D10 represents a predetermined thickness corresponding to the distance between the front surface of the interconnector of one cell unit and the back surface of the interconnector of another cell unit stacked on the one cell unit (i.e., D10 represents the predetermined distance between the interconnectors), and D20 represents the sum of a predetermined thickness of the connection member of the one cell unit and the thickness of the single cell of the one cell unit.

As used herein, the "predetermined distance D10" between the interconnectors corresponds to the shortest distance between the interconnectors after production of the fuel cell; and the "predetermined thickness" of the connection member of the cell unit corresponds to the thickness of the connection member of the cell unit after production of the fuel cell. After production of the fuel cell, the connection member of each cell unit may contract (i.e., the thickness thereof may decrease) through clamping. Therefore, such contraction is preferably taken into consideration.

Since the predetermined distance D10 between the interconnectors, and the sum D20 of the predetermined thickness of the connection member of the one cell unit and the thickness of the single cell of the one cell unit satisfy a specific relation of "0≤(D20−D10)≤200 μm," when, for example, a plurality of the cell units are stacked together to thereby produce a fuel cell stack, the contact resistance between the connection member and the single cell can be reduced.

(3) The connection member may be an electrically conductive current collector exhibiting elasticity.

When the connection member is an electrically conductive current collector exhibiting elasticity, preferable electrical connection can be secured between the interconnector and the single cell.

(4) The connection member may include at least an insulative adjustment member and an electrically conductive current collector.

When the connection member is formed of a combination of an insulative adjustment member and an electrically conductive current collector, more preferable electrical connection can be secured between the interconnector and the single cell.

The connection member may have an integral structure formed of a combination of at least an insulative adjustment member and an electrically conductive current collector. Alternatively, the connection member may have an integral structure formed of a combination of at least an insulative adjustment member and an electrically conductive current collector exhibiting elasticity. The insulative adjustment member may exhibit elasticity.

(5) The connection member may be in contact with the anode of the single cell.

When the connection member is provided on the anode side of the single cell, the material of the connection member is readily selected. That is, since the anode is surrounded by a reducing atmosphere, the connection member is not oxidized. Therefore, the material of the connection member can be selected without taking into consideration the oxidation resistance of the connection member.

(6) The fuel cell may further comprise one or more frames which are provided between the interconnector of one cell unit and the interconnector of another cell unit stacked on the one cell unit.

When the interconnector is provided separately from the frame, the interconnector can be produced from a flat plate, and thus production cost can be reduced. The interconnector may be integrated with the frame. However, employment of such an integrated member requires, for example, a counterboring process, resulting in an increase in cost.

Examples of the frame include frame members (cell frame and separator), cathode insulation sealing members (cathode insulation frame), and anode insulation sealing members (anode insulation frame).

(7) The fuel cell may further comprise a clamping member for clamping a plurality of the cell units in a stacking direction, wherein the clamping member clamps the cell units at the separators and the frames.

With this configuration, more preferable electrical connection can be secured between the interconnector and the single cell.

2. "Fuel Cell Production Method"

(8) Another mode of the present invention is a method for producing a fuel cell, the method comprising a step of stacking a plurality of cell units, each cell unit comprising at least an electrically conductive interconnector having a front surface and a back surface; a connection member which is electrically connected to the interconnector; a single cell which includes an anode, an electrolyte, and a cathode, and which is electrically connected to the connection member; and a separator having an opening which is connected to an outer peripheral portion of the single cell, the method being characterized by comprising at least a step of providing a plurality of connection members having different thicknesses; a step of measuring a thickness D23 of the single cell; a step of selecting, from among the connection members having different thicknesses, a connection member having a thickness corresponding to the difference obtained by subtracting the thickness D23 from a predetermined thickness D10 corresponding to the distance between the front surface of the interconnector of one cell unit and the back surface of the interconnector of another cell unit stacked on the one cell unit; and a step of stacking a cell unit including the selected connection member.

In the production method, there is selected, from among the connection members having different thicknesses, a connection member having a thickness corresponding to the difference obtained by subtracting the measured thickness D23 of the single cell from the predetermined thickness D10 corresponding to the distance between the interconnectors (i.e., the difference (D10−D23)). Thus, the sum of the thickness D23 of the single cell and the thickness of the connection member corresponds to the distance between the interconnectors. Therefore, even when the single cells have non-uniform thicknesses, contact resistance can be reduced between the single cells and the connection members.

The thickness D10 corresponding to the distance between the interconnectors, the shortest distance D1 between the interconnectors, and the below-described predetermined value Dc satisfy the following relation.

$$D10 = D1 + Dc$$

The thickness D10 corresponding to the distance between the interconnectors (the predetermined distance D10 between the interconnectors) may be represented by the following formula.

$$D10 = D11 + D121 + D131$$
$$= D11 + (D12 + D13) \times Ac$$

D11: the thickness of a frame member 161 (including the thickness of a separator 123)

D12: the thickness of a cathode insulation sealing member (before clamping (before contraction))

D121: the thickness of the cathode insulation sealing member (after clamping (after contraction))

D13: the thickness of an anode insulation sealing member (before clamping (before contraction))

D131: the thickness of the anode insulation sealing member (after clamping (after contraction))

Ac: the percent contraction of the insulation sealing member (9) The absolute value of the difference between the aforementioned subtraction value and the thickness of the above-selected connection member is preferably 50 μm or less.

In such a case, the sum of the thickness D23 of the single cell and the thickness of the connection member reliably corresponds to the distance between the interconnectors. Therefore, contact resistance can be readily controlled between the connection member and the single cell.

(10) The connection member may include at least an insulative adjustment member and an electrically conductive current collector, and the connection member selection step may include a step of selecting the adjustment member.

When the adjustment member (i.e., a portion of the connection member) is selected instead of selection of the entire connection member, contact resistance can be readily controlled between the connection member and the single cell.

Effects of the Invention

According to the present invention, there can be provided a fuel cell which readily realizes a reduction in contact resistance, and a method for producing the fuel cell.

MODES FOR CARRYING OUT THE INVENTION

Embodiments of the present invention will next be described in detail with reference to the drawings.

(First Embodiment)

Figure 1:
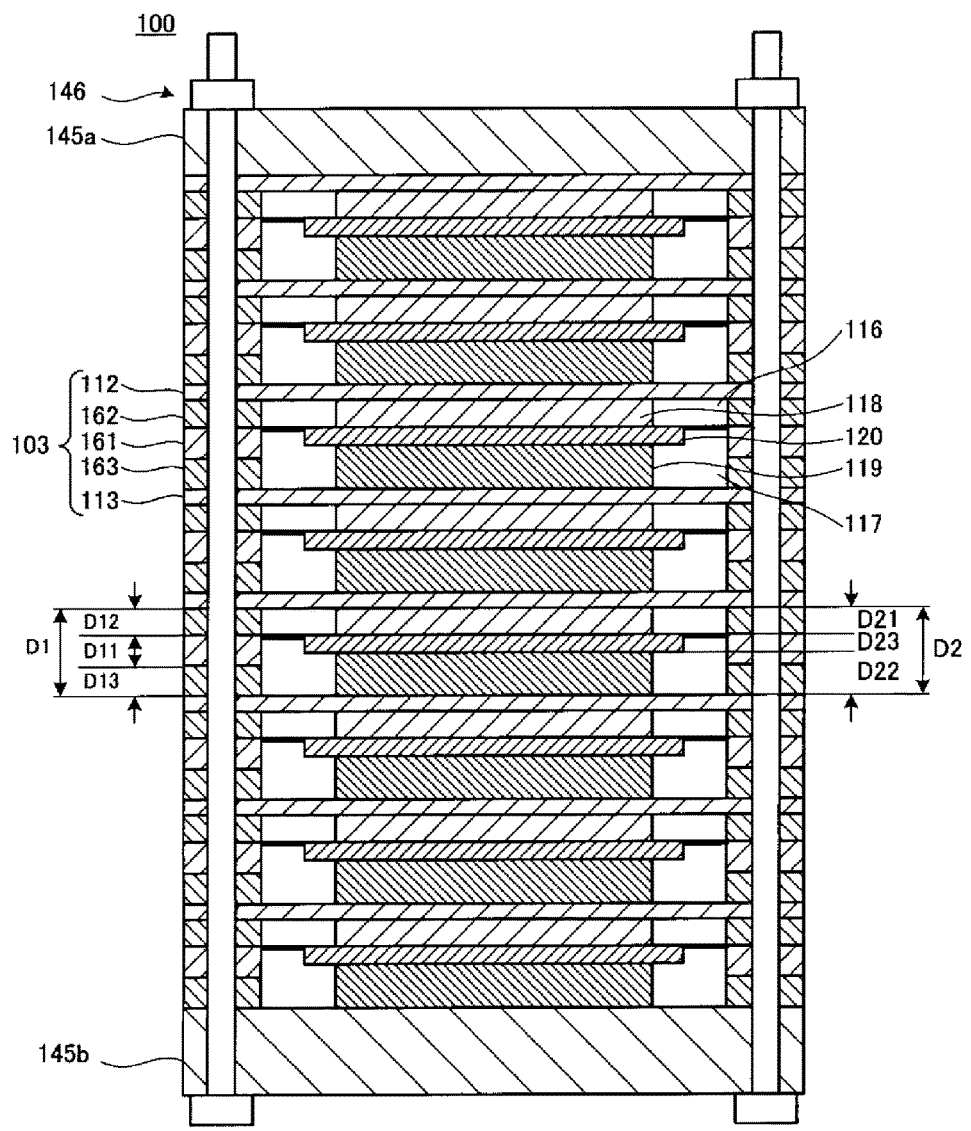
FIG. 1 is a schematic cross-sectional view of a fuel cell stack 100 according to a first embodiment.

FIG. 1 is a schematic cross-sectional view of a fuel cell stack (fuel cell) 100 according to a first embodiment. The fuel cell stack 100 includes a plurality of cell units 103, end plates 145a and 145b, and clamping members 146.

Each cell unit 103 includes interconnectors 112 and 113, a single cell 120, an air chamber 116, a fuel chamber 117, connection members 118 and 119, a frame member 161, an anode insulation sealing member 163, and a cathode insulation sealing member 162.

The interconnectors 112 and 113 are in quadrangular plate form in plan view, and are formed of, for example, an electrically conductive metal. The interconnectors 112 and 113 are arranged in a vertical direction.

The single cell 120 has an electrolyte, a cathode, and an anode (which are not illustrated). The cathode and the anode are respectively provided on the upper and lower surfaces of the electrolyte.

The air chamber 116 is a space into which an oxidant gas is supplied, and the fuel chamber 117 is a space into which a fuel gas is supplied.

The connection member 118 is a current collection member which is provided within the air chamber 116, and which electrically connects the cathode 114 of the single cell 120 to the interconnector 112.

The connection member 119 is a current collection member which is provided within the fuel chamber 117, and which electrically connects the anode 115 of the single cell 120 to the interconnector 113.

As also shown below in FIG. 3, a gap is provided between the connection member 118 and the single cell (also between the connection member 119 and the single cell).

The gap between the connection member 118 and the single cell forms a portion of the air chamber 116, and the cathode 114 is exposed to an oxidant gas. Similarly, the gap between the connection member 119 and the single cell forms a portion of the fuel chamber 117, and the anode 115 is exposed to a fuel gas.

The frame member 161 has an opening, and the single cell 120 is provided within the opening. The frame member 161 is divided, by means of the single cell 120, into a portion corresponding to the air chamber 116 and a portion corresponding to the fuel chamber 117. The frame member 161 corresponds to a combination of a cell frame 122 and a separator 123 described in the example hereinbelow.

The cathode insulation sealing member 162 is a frame-shaped insulation member for insulation and sealing of a portion of the frame member 161 on the cathode 114 side. The cathode insulation sealing member 162 corresponds to a cathode insulation frame 124 described in the example hereinbelow.

The anode insulation sealing member 163 is a frame-shaped insulation member for insulation and sealing of a portion of the frame member 161 on the anode 115 side. The anode insulation sealing member 163 corresponds to an anode insulation frame 121 described in the example hereinbelow.

The end plates 145a and 145b vertically sandwich the stacked cell units 103.

Each clamping member 146 includes, for example, a combination of a bolt and a nut, and clamps the stacked cell units 103 in a stacking direction, whereby clamping pressure is applied thereto. Through application of clamping pressure to the cell units 103, contact resistance can be reduced in the fuel cell stack 100 (e.g., between the connection member 119 and the single cell 120).

In the fuel cell stack 100 according to the embodiment of the present invention, at least one connection member 119 of a plurality of the connection members 119 has a thickness different from that of another connection member 119. Since the connection members 119 each being provided between the interconnectors 112 and 113 have different thicknesses, even when the single cells 120 have non-uniform thicknesses, contact resistance can be reduced between the connection members 119 and the single cells 120.

Specifically, the shortest distance D1 between the upper surface (front surface) of the interconnector 113 and the lower surface (back surface) of the interconnector 112 corresponds to the sum thickness D2 of the thicknesses of the connection members 118 and 119 and the thickness of the single cell 120.

As shown by formula (1), the distance D1 is determined by the sum of the thickness D11 of the frame member 161 (the thickness D11 includes the thickness of the separator 123; the same shall apply hereinafter), the thickness D12 of the cathode insulation sealing member 162, and the thickness D13 of the anode insulation sealing member 163.

$$D1=D11+D12+D13 \quad \text{formula (1)}$$

As shown by formula (2), the sum thickness D2 is the sum of the thickness D21 of the connection member 118, the thickness D22 of the connection member 119, and the thickness D23 of the single cell 120.

$$D2=D21+D22+D23 \quad \text{formula (2)}$$

The thicknesses D11, D12, D13, D21, D22, and D23 correspond to those before clamping by means of the clamping member 146.

The clamping member 146 includes, for example, a bolt and a nut. The clamping member 146 clamps and fixes a plurality of the cell units 103 in a stacking direction at the separators 123 and the frame members 161.

When the difference between the distance D1 and the sum thickness D2 (i.e., D2−D1) satisfies a relation of "0≤(D2−D1)≤200 μm," they can be regarded as corresponding to each other. In the case where the distance D1 and the sum thickness D2 correspond to each other, even when the single cells 120 have non-uniform thicknesses, contact resistance can be reduced between the connection members 119 and the single cells 120.

Figure 2:
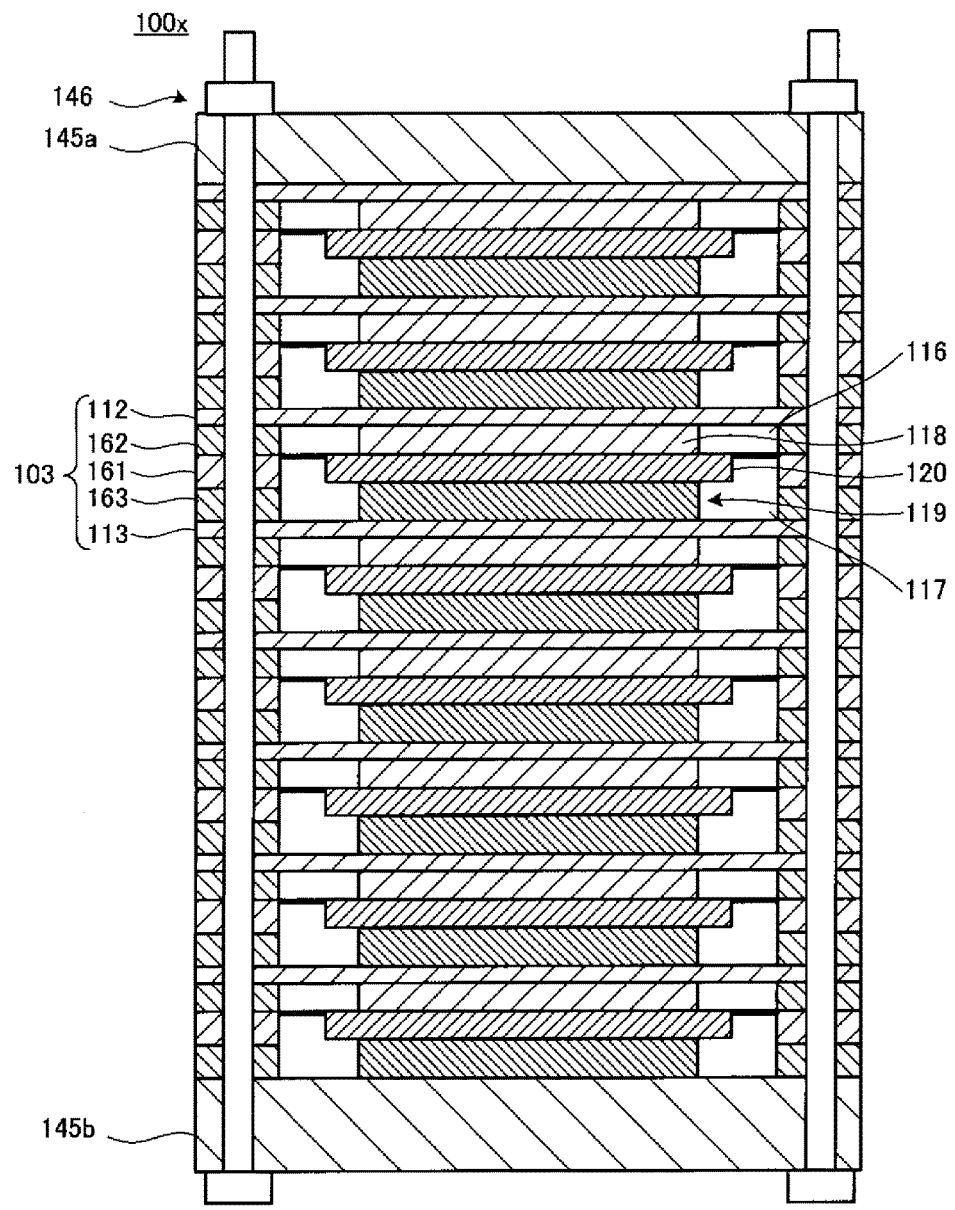
FIG. 2 is a schematic cross-sectional view of a fuel cell stack 100x according to Comparative Example 1.
Figure 3:
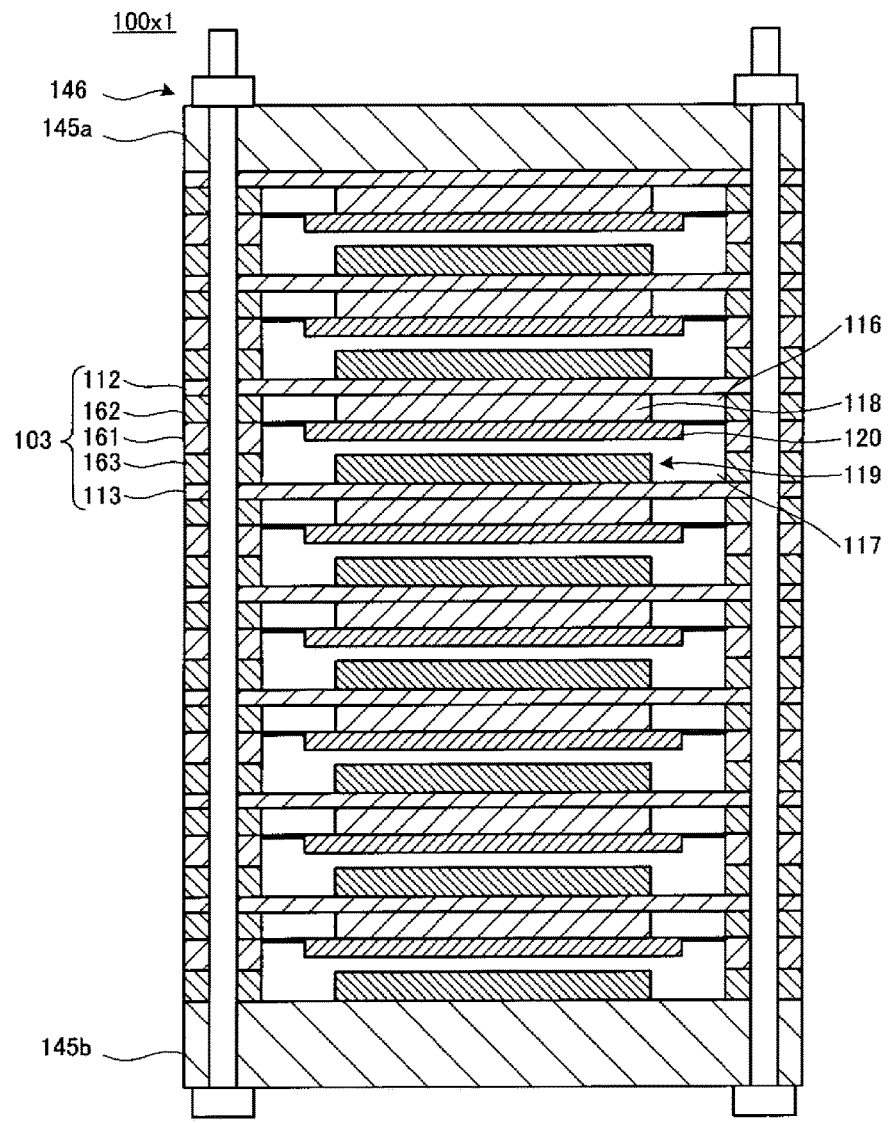
FIG. 3 is a schematic cross-sectional view of a fuel cell stack 100x1 according to Comparative Example 2.
Figure 4:
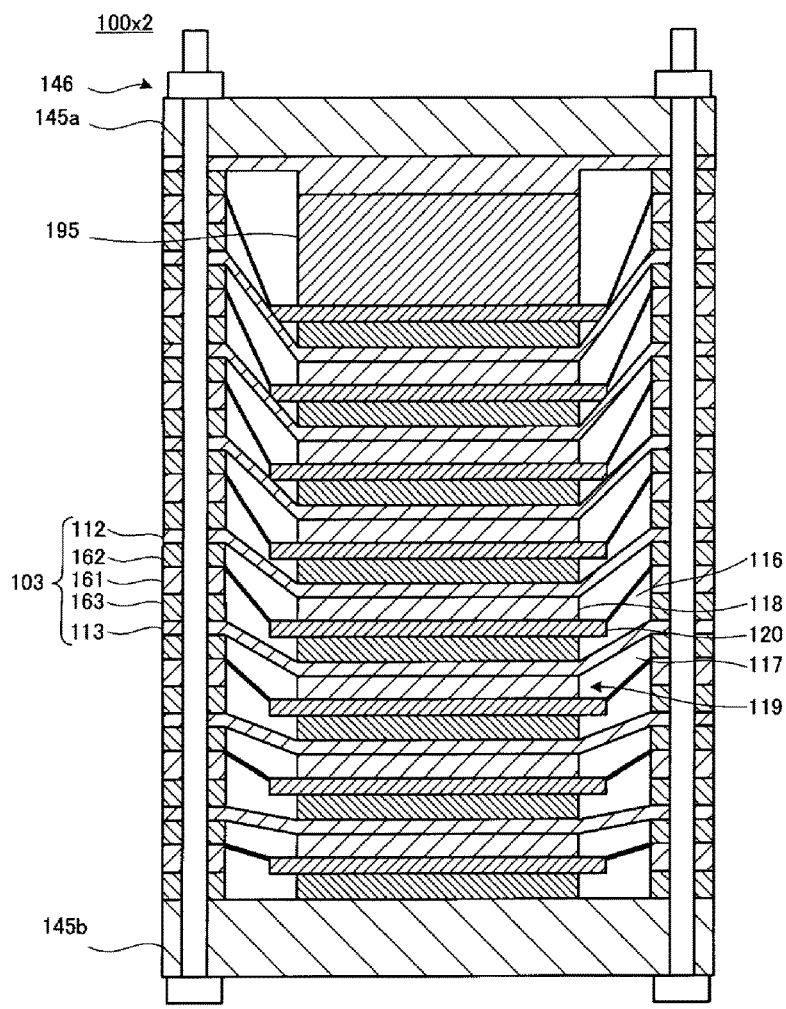
FIG. 4 is a schematic cross-sectional view of a fuel cell stack 100x2 according to Comparative Example 3.

FIGS. 2 to 4 are respectively schematic cross-sectional views of fuel cell stacks 100x, 100x1, and 100x2 according to Comparative Examples 1 to 3.

As shown in FIG. 2 (Comparative Example 1), when components forming the cell units 103 (e.g., a single cell 120) have uniform dimensions, the components are properly accommodated in the respective cell units 103, and contact resistance can be reduced between the connection members 119 and the single cells 120. Therefore, electrical connection is secured in each cell unit 103, and in the entire fuel cell stack 100.

In some cases, components (e.g., single cells 120) forming the cell units 103 may have non-uniform thicknesses. As shown in FIG. 3 (Comparative Example 2), when, for example, a single cell 120 having a thickness considerably smaller than the standard thickness is employed, the single cell 120 may fail to be electrically connected to either (or both) of the interconnectors 112 and 113. In the case of Comparative Example 2, the single cell 120 is not connected to the connection member 119, and thus electrical connection is not achieved between the single cell 120 and the interconnector 113.

In such a case, for example, as shown in FIG. 4 (Comparative Example 3), a spacer (adjustment member) 195 may be inserted between the uppermost connection member 118 and the single cell 120. In this case, contact resistance is controlled through application of clamping pressure by means of the clamping member 146. Therefore, in the cell unit 103 nearer to the adjustment member 195, components of the cell unit may be considerably deformed, resulting in damage to the members due to stress concentration (e.g., breakage of the single cell 120).

In contrast, in the present embodiment, since the thickness of each cell unit 103 can be adjusted, uniform pressure distribution is achieved in the fuel cell stack 100, and the probability of damage to the members is reduced.

That is, since the thickness of each cell unit 103 can be adjusted, deformation of each cell unit 103 is suppressed, and stress in association with deformation of the members is reduced, whereby the probability of breakage of the members (e.g., the single cell 120) can be lowered.

The contact resistance in each cell unit 103 (e.g., between the connection member 119 and the single cell 120) is determined by the contact pressure therebetween. This contact pressure is determined by the difference (D2−D1); i.e., the difference obtained by subtracting the shortest distance D1 between the upper surface of the interconnector 113 and the lower surface of the interconnector 112 (the sum of the thickness D11 of the frame member 161, the thickness D12 of the cathode insulation sealing member 162, and the thickness D13 of the anode insulation sealing member 163) from the sum thickness D2 of the thicknesses D21 and D22 of the connection members 118 and 119 and the thickness D23 of the single cell 120.

That is, when the difference (D2−D1) is small, contact pressure can be appropriately controlled. However, when the difference (D2−D1) is large, contact pressure is substantially not controlled between, for example, the connection member 119 and the single cell 120, and, in some cases, contact pressure itself may fail to be applied (see Comparative Example 2 above). Thus, a decrease in difference (D2−D1) is important for reducing contact resistance through control of clamping pressure by means of the clamping member 146.

Meanwhile, contact pressure may be controlled by adjusting the thickness of the sealing member (the frame member 161, the cathode insulation sealing member 162, or the anode insulation sealing member 163). However, in this case, a change in thickness of the sealing member itself may affect sealing performance.

In contrast, in the present embodiment, contact pressure is controlled through adjustment of the thickness of the connection member 119. Therefore, contact pressure can be controlled without causing any effect on sealing performance.

Contact pressure may be controlled through adjustment of the thickness of the connection member 118 on the cathode side of the single cell, rather than adjustment of the thickness of the connection member 119 on the anode side of the single cell.

For example, either or both of the following conditions (i) and (ii) may be satisfied:

(i) the connection member (on the anode side of the single cell) of at least one cell unit of a plurality of the aforementioned cell units has a thickness different from that of the connection member (on the anode side of the single cell) of another cell unit; and (ii) the connection member (on the cathode side of the single cell) of at least one cell unit of a plurality of the aforementioned cell units has a thickness different from that of the connection member (on the cathode side of the single cell) of another cell unit.

In the aforementioned description, a change in dimension of the members before and after assembly is not particularly taken into consideration. However, as described below, a change in dimension of the members before and after assembly (before and after clamping) will be taken into consideration. Preferably, the fuel cell stack is designed by taking into consideration a change in dimension of the members before and after assembly (before and after clamping).

Figure 5A:
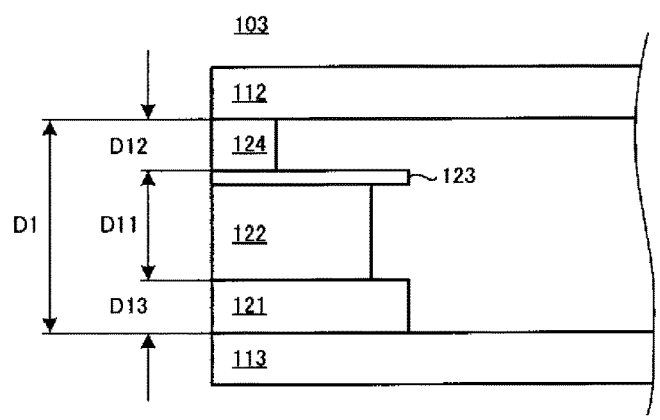
FIG. 5A is a schematic cross-sectional view of a cell unit 103, and shows the dimensions of members of the cell unit 103 before assembly (clamping).
Figure 5B:
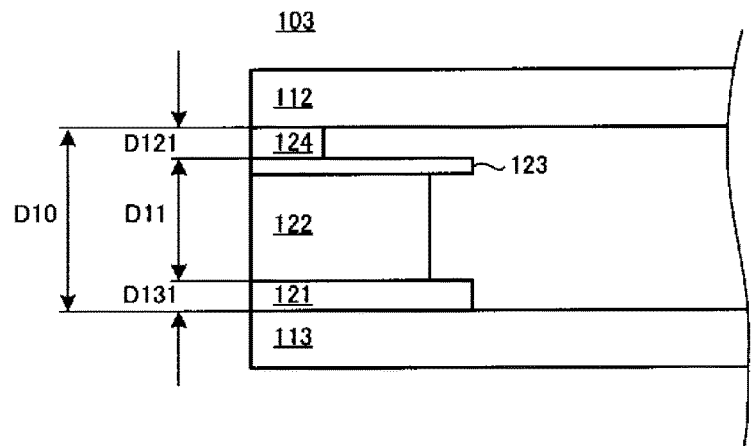
FIG. 5B is a schematic cross-sectional view of the cell unit 103, and shows the dimensions of the members of the cell unit 103 after assembly (clamping).

FIGS. 5A and 5B respectively show the dimensions of the members forming the cell unit 103 before and after assembly (clamping). As shown in these figures, through clamping by means of the clamping member 146, the thickness of the cathode insulation frame 124 decreases from D12 to D121, and the thickness of the anode insulation frame 121 decreases from D13 to D131. Since each of the cathode insulation frame 124 and the anode insulation frame 121 is formed of an elastic material (e.g., mica), the thickness thereof decreases through clamping during production of the fuel cell stack.

The relationship between the dimension of each insulation sealing member before assembly (clamping) and that after assembly (clamping) is as follows.

$$D121 = D12 \times Ac$$

$$D131 = D13 \times Ac$$

Ac: the percent contraction (the rate of change in dimension before and after assembly) of each insulation sealing member The thickness D10 between the interconnectors corresponds to the distance between the front surface of the interconnector of one cell unit and the back surface of the interconnector of another cell unit stacked on the one cell unit, and corresponds to the shortest distance between the interconnectors after production of the fuel cell. After production of the fuel cell, the connection member of each cell unit may contract (i.e., the thickness thereof may decrease) through clamping. Therefore, such contraction is preferably taken into consideration.

The thickness D10 may be represented as follows.

$$D10 = D11 + D121 + D131$$
$$= D11 + (D12 + D13) \times Ac$$

Figure 5C:
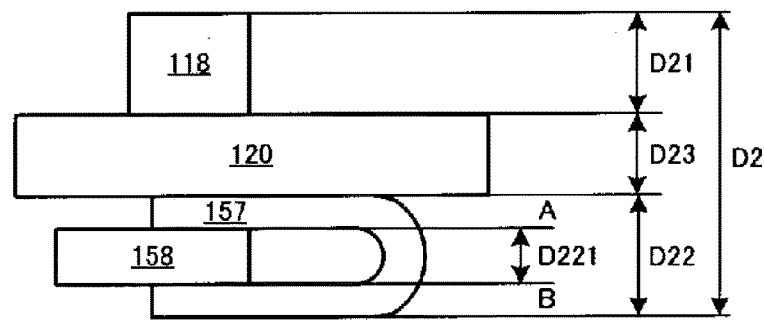
FIG. 5C is a schematic cross-sectional view of the cell unit 103, and shows the dimensions of members of the cell unit 103 before assembly (clamping).
Figure 5D:
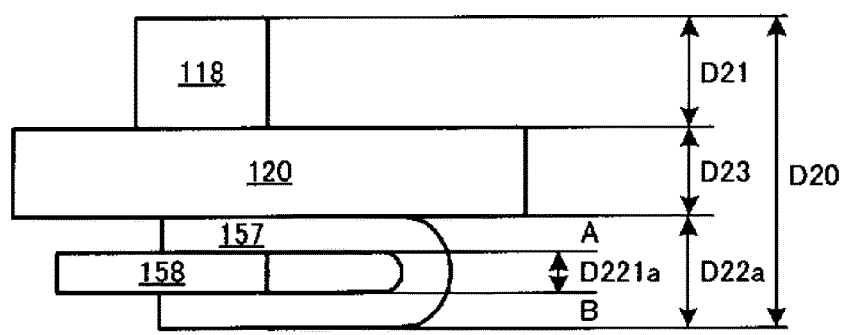
FIG. 5D is a schematic cross-sectional view of the cell unit 103, and shows the dimensions of the members of the cell unit 103 after assembly (clamping).

FIGS. 5C and 5D respectively show the dimensions of the members forming the cell unit 103 before and after assembly (clamping). As shown in these figures, through clamping by means of the clamping member 146, the thickness of the adjustment member 158 decreases from D221 to D221a. Since the adjustment member 158 is formed of an elastic material (e.g., mica), the thickness thereof decreases through clamping during production of the fuel cell stack.

The sum thickness D2 before assembly (clamping) is represented as follows.

$$D2 = D21 + D23 + D22$$
$$= D21 + D23 + D221 + D222 (= A + B)$$

D21: the thickness of the connection member 118
D22: the thickness of the current collector 157 (the total thickness of the current collector 157 and the adjustment member 158)
D221: the thickness of the adjustment member 158 before clamping
D222: the thickness of the current collector 157 itself
D23: the thickness of the single cell 120

In consideration of contraction of the members before and after assembly (clamping), the sum thickness D20 after contraction is represented as follows.

$$D20 = D21 + D23 + D22a$$
$$= D21 + D23 + D221a + D222 (= A + B)$$
$$= D21 + D23 + D221 \times Ac2 + D222 (= A + B)$$

D22a: the total thickness of the current collector 157 and the adjustment member 158 after clamping
D221a: the thickness of the adjustment member 158 after clamping
Ac2: the percent contraction of the adjustment member 158

The adjustment member 158 (e.g., mica) contracts through application of pressure during assembly of the fuel cell stack.

In consideration of clamping during production of the fuel cell stack, the difference between the distance D10 and the sum thickness D20≤(i.e., D20−D10) after clamping must satisfy a relation of "0≤(D20−D10)≤200 µm."

(Second Embodiment)

Figure 6:
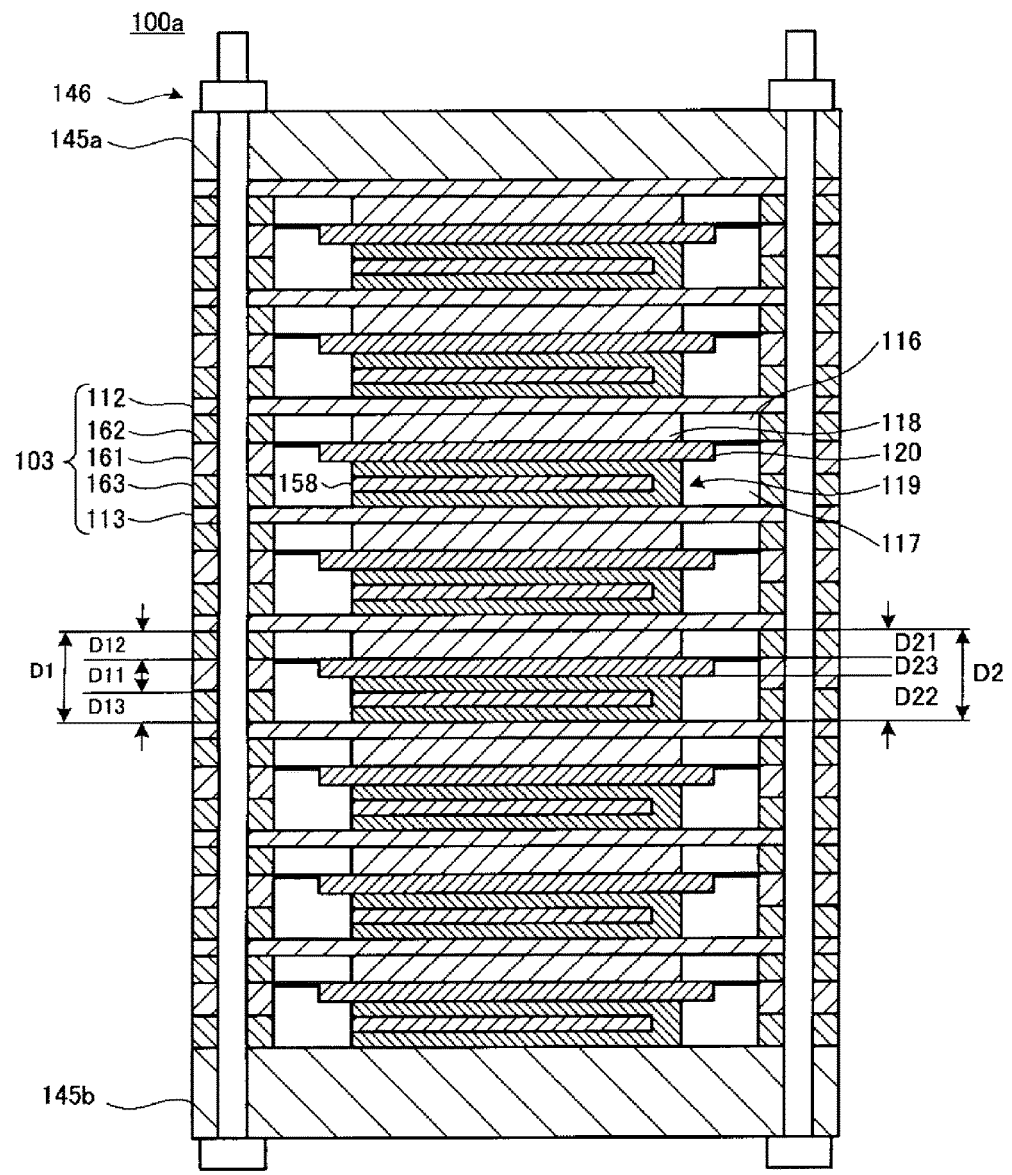
FIG. 6 is a schematic cross-sectional view of a fuel cell stack 100a according to a second embodiment.

FIG. 6 is a schematic cross-sectional view of a fuel cell stack 100a according to a second embodiment.

In this embodiment, a connection member 119 includes therein an adjustment member 158. That is, the thickness of the connection member 119 can be adjusted only by the thickness of the adjustment member 158, rather than the thickness of the entire connection member 119. Specifically, the connection member 119 includes a combination of the adjustment member 158 and a current collector 157, wherein the adjustment member 158, which has a thickness corresponding to that of a single cell 120, is inserted into the current collector 157.

In this case, the adjustment member 158 may be formed of an insulative material (e.g., mica). That is, the connection member 119, which includes a combination of the insulative adjustment member 158 and the electrically conductive current collector 157, electrically connects the single cell 120 to an interconnector 113.

Thus, when contact pressure is controlled by means of the adjustment member 158 of the connection member 119, since a change in thickness of the connection member 119 itself is reduced, the influence of the connection member 119 on power collection performance is suppressed.

Alternatively, contact pressure may be controlled by adjusting the thickness of an adjustment member of a connection member 118 stacked on the cathode side of the single cell 120, rather than the thickness of the adjustment member of the connection member 119 stacked on the anode side of the single cell 120.

(Production Method for Fuel Cell Stack 100)

Next will be described a method for producing the fuel cell stack 100.

The production method of the embodiment according to the present invention will next be described by taking, as an example, the case where the thickness of a connection member on the anode side is adjusted. However, the present invention is not limited thereto, and, for example, the thickness of a connection member on the cathode side may be adjusted.

(1) Preparation of a Plurality of Connection Members 119 Having Different Thicknesses A plurality of connection members 119 having different thicknesses are prepared in advance. For example, connection members 119 having thicknesses with 50 μm increments are provided. In the case of the second embodiment, a plurality of adjustment members 158 having different thicknesses are prepared in advance, rather than a plurality of connection members 119 having different thicknesses.

(2) Measurement of Thickness D23 of Single Cell 120

The thickness D23 of a single cell 120 is measured. For example, the thickness D23 of the single cell 120 may be measured by means of a micrometer.

(3) Selection of Connection Member 119 Having a Thickness Corresponding to Thickness D23 of Single Cell 120

There is selected a connection member 119 having a thickness corresponding to the thickness D23 of the single cell 120.

1) Before this selection, the thickness D10 corresponding to the distance between interconnectors 112 and 113 is determined. The distance D10 is obtained by, for example, adding a predetermined value Dc to the standard sum D1 of the thickness D11 of a frame member 161, the thickness D12 of a cathode insulation sealing member 162, and the thickness D13 of an anode insulation sealing member 163.

Specifically, the thickness D10 corresponding to the distance between the interconnectors, the shortest distance D1 between the interconnectors, and the predetermined value Dc satisfy the following relation.

$$D10 = D1(=D11+D12+D13) + Dc$$

The thickness D10 may be represented as follows.

$$D10 = D11 + (D12+D13) \times Ac$$

2) The above-measured thickness D23 is subtracted from the thickness D10, to thereby calculate a subtraction value (D10−D23).

The subtraction value corresponds to the sum of the thicknesses of the connection members 118 and 119 (i.e., D21+D22).

Thickness adjustment may be carried out by means of only the connection member 119. In this case, the thickness of the connection member 118 is measured, and a subtraction value (D10−D23−D21) is calculated.

3) The connection member 119 having a thickness corresponding to the subtraction value (D10−D23−D21) is selected. In the case of the second embodiment, the adjustment member 158 (i.e., a portion of the connection member 119) is selected, rather than the entire connection member 119.

In this case, as described below, the percent contraction Ac2 of the adjustment member 158 is preferably taken into consideration for determining the thickness D22 of the connection member 119.

$$D22a = D222 + D221 \times Ac2 = (D10 - D21 - D23)$$

$$D22 = D222 + D221$$
$$= D222 + (D10 - D21 - D23 - D222)/Ac2$$

(4) Stacking of Cell Unit 103 Including Selected Connection Member 119

Cell units 103 each including a selected connection member 119 are stacked, and the thus-stacked cell units 103 are sandwiched by means of end plates 145*a* and 145*b* and clamped by means of clamping members 146.

As described above, a connection member 119 having a thickness corresponding to the thickness D23 of the single cell 120 is selected in each of the stacked cell units 103. Thus, thickness (contact pressure) can be controlled in each of the cell units 103. Therefore, contact resistance can be reduced in the fuel cell stack 100, and damage to the members due to stress concentration can be prevented.

EXAMPLES

Figure 7:
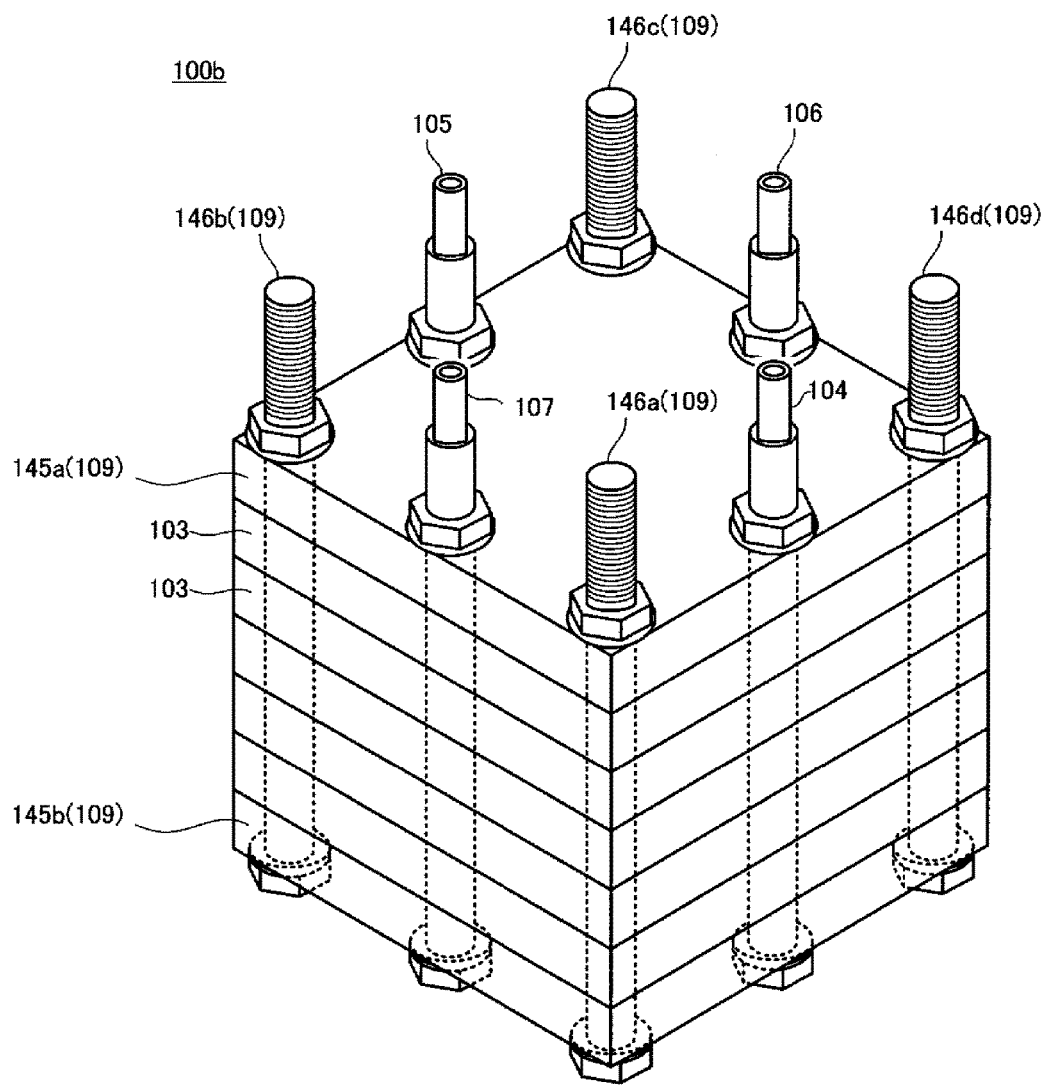
FIG. 7 is a perspective view of a fuel cell stack 100b according to an example.
Figure 8:
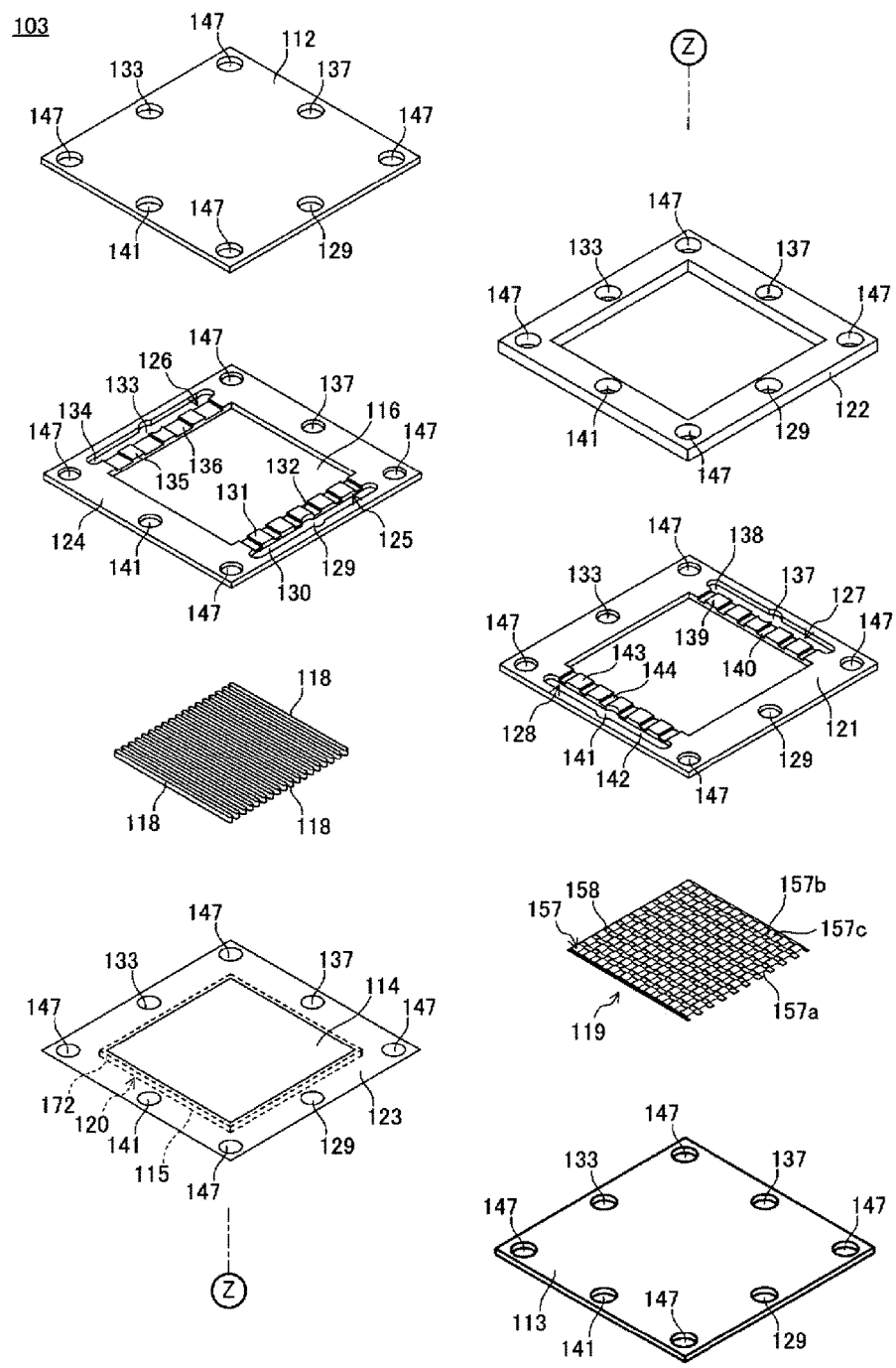
FIG. 8 is an exploded perspective view of a cell unit 103 of the fuel cell stack 100b.
Figure 9:
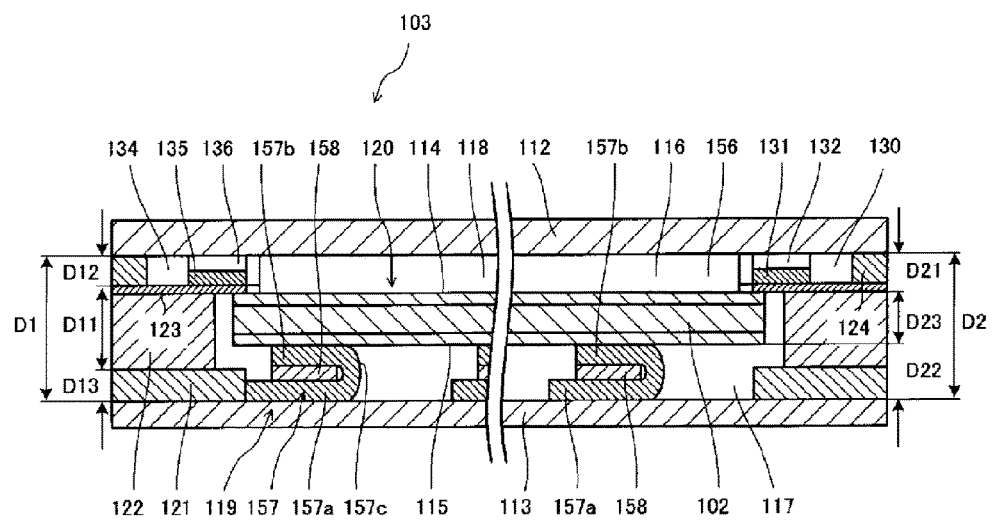
FIG. 9 is a schematic cross-sectional view of the cell unit 103 of the fuel cell stack 100b.

FIGS. 7 to 9 are, for example, a perspective view of a fuel cell stack 100*b* according to an example.

This example corresponds to the second embodiment. That is, the connection member 119 includes the adjustment member 158, and the thickness of the connection member 119 can be adjusted by means of only the adjustment member 158.

As shown in FIG. 9, a combination of a cell frame 122 and a separator 123 corresponds to the frame member 161 according to the aforementioned embodiment. Also, a cathode insulation frame 124 and an anode insulation frame 121 respectively correspond to the cathode insulation sealing member 162 and the anode insulation sealing member 163 according to the aforementioned embodiment.

The fuel cell stack 100*b* includes cell units 103, an air supply path 104, an air discharge path 105, a fuel supply path 106, a fuel discharge path 107, and fixing members 109.

Each cell unit 103 serves as a minimum unit for current generation, and includes interconnectors 112 and 113, a single cell 120, an air chamber 116, a fuel chamber 117, and connection members 118 and 119.

The interconnectors 112 and 113 are in quadrangular plate form in plan view, and are formed of, for example, electrically conductive ferrite stainless steel. The interconnectors 112 and 113 are arranged in a vertical direction.

The single cell 120 is located generally at the middle between the interconnectors 112 and 113, and has an electrolyte 102, a cathode 114, and an anode 115. The cathode 114 and the anode 115 are respectively provided on the upper and lower surfaces of the electrolyte 102.

The electrolyte 102 may be formed of, for example, a $ZrO_2$ ceramic material, an $LaGaO_3$ ceramic material, a $BaCeO_3$ ceramic material, an $SrCeO_3$ ceramic material, an $SrZrO_3$ ceramic material, or a $CaZrO_3$ ceramic material.

The anode 115 may be formed of a mixture of a metal such as Ni or Fe, and at least one species selected from among ceramic materials such as $CeO_2$ ceramic materials and $ZrO_2$ ceramic materials (e.g., zirconia stabilized by at least one species selected from among rare earth elements such as Sc and Y). The anode 115 may be formed of a metal such as Pt, Au, Ag, Pb, Ir, Ru, Rh, Ni, or Fe. The anode 115 may be formed of only one species of these metals, or an alloy of two or more species of the metals. Alternatively, the anode 115 may be formed of a mixture of such a metal and/or an alloy thereof and at least one species of the aforementioned ceramic materials (the mixture including cermet). Alternatively, the anode 115 may be formed of, for example, a mixture of an oxide of a metal such as Ni or Fe, and at least one species of the aforementioned ceramic materials.

The cathode 114 may be formed of, for example, any metal, any metal oxide, or any metal multiple oxide. Examples of the metal include metals such as Pt, Au, Ag, Pb, Ir, Ru, and Rh; and alloys containing two or more of these metals. Examples of the metal oxide include oxides of La, Sr, Ce, Co, Mn, Fe, and the like (e.g., $La_2O_3$, SrO, $Ce_2O_3$, $Co_2O_3$, $MnO_2$, and FeO). Examples of the multiple oxide include multiple oxides containing, for example, at least La, Pr, Sm, Sr, Ba, Co, Fe, or Mn (e.g., $La_{1-x}Sr_xCoO_3$ multiple oxides, $La_{1-x}Sr_xFeO_3$ multiple oxides, $La_{1-x}Sr_xCo_{1-y}FeO_3$ multiple oxides, $La_{1-x}Sr_xMnO_3$ multiple oxides, $Pr_{1-x}Ba_x$-$CoO_3$ multiple oxides, and $Sm_{1-x}Sr_xCoO_3$ multiple oxides).

The air chamber 116 is provided between the interconnector 112 and the cathode 114, and is a space into which an oxidant gas is supplied. The air chamber 116 is defined by the separator 123, the cathode insulation frame 124, and the interconnector 112.

The separator 123 is formed of an electrically conductive, thin metallic quadrangular frame, and the electrolyte 102 is attached to the lower surface of the separator 123.

The cathode insulation frame 124 is provided between the separator 123 and the upper interconnector 112. The cathode insulation frame 124 surrounds the connection member 118, and serves as an insulation frame for formation of an oxidant gas path. As described above, the cathode insulation frame 124 corresponds to the cathode insulation sealing member 162 according to the aforementioned embodiment.

The fuel chamber 117 is provided between the interconnector 113 and the anode 115, and is a space into which a fuel gas is supplied. The fuel chamber 117 is defined by a combination of the interconnector 113, the anode insulation frame 121, and the cell frame 122.

The anode insulation frame 121 surrounds the connection member 119, and is provided on the upper surface of the lower interconnector 113. The anode insulation frame 121 serves as an insulation frame for formation of a fuel gas path. As described above, the anode insulation frame 121 corresponds to the anode insulation sealing member 163 according to the aforementioned embodiment.

The cell frame 122 is provided on the upper surface of the anode insulation frame 121. As described above, a combination of the cell frame 122 and the separator 123 corresponds to the frame member 161 according to the aforementioned embodiment.

The connection member 118 is provided within the air chamber 116, and electrically connects the cathode 114 to the upper interconnector 112.

The connection member 118 on the side toward the air chamber 116 is formed of a dense electrically conductive member having an elongated squared timber shape (e.g., a stainless steel material). A plurality of connection members 118 are arranged in parallel at certain intervals so as to abut the cathode 114 on the upper surface of the electrolyte 102 and the lower surface (inner surface) of the upper interconnector 112. The connection member 118 on the side toward the air chamber 116 may have the same structure as the connection member 119 on the side toward the fuel chamber 117.

The connection member 119 is provided within the fuel chamber 117, and electrically connects the anode 115 to the lower interconnector 113.

The connection member 119 has a structure of a combination of an electrically conductive power collector 157 and an insulative adjustment member 158. The power collector 157 is formed of, for example, an Ni plate material, and has a connector abutment portion 157a, a single cell abutment portion 157b, and a communication portion 157c.

By means of the elastic force of the U-shaped communication portion 157c, the connector abutment portion 157a and the single cell abutment portion 157b are respectively biased toward the interconnector 113 and the single cell 120. In addition, the connection member 119 can flexibly follow deformation of the single cell 120 resulting from a temperature cycle or a change in, for example, fuel pressure or air pressure.

The connector abutment portion 157a abuts the lower interconnector 113, and the single cell abutment portion 157b abuts the anode 115 of the single cell 120.

The communication portion 157c is a U-shaped member which connects the connector abutment portion 157a and the single cell abutment portion 157b.

By means of the elastic force of the U-shaped communication portion 157c, the connector abutment portion 157a and the single cell abutment portion 157b are respectively biased toward the interconnector 113 and the single cell 120. In addition, the connection member 119 can flexibly follow deformation of the single cell 120 resulting from a temperature cycle or a change in, for example, fuel pressure or air pressure.

The power collector 157 may be formed of, in place of a plate material, for example, porous Ni, Ni mesh, or Ni wire. Alternatively, the power collector 157 may be formed of, in place of Ni, an oxidation-resistant metal such as an Ni alloy or stainless steel.

As shown in FIG. 9, the connection member 119 is provided with the adjustment member 158. In the fuel chamber 117 between the single cell 120 and the lower interconnector 113, the adjustment member 158 is provided between the connector abutment portion 157a and the single cell abutment portion 157b.

The adjustment member 158 is formed of a material which is not sintered to the power collector 157 at the operating temperature region of the fuel cell. Therefore, the single cell abutment portion 157b and the connector abutment portion 157a are not sintered together by coming into direct contact with each other, and the single cell abutment portion 157b and the connector abutment portion 157a are not sintered to each other via the adjustment member 158.

The material of the adjustment member 158 satisfying the aforementioned conditions may be any of mica, alumina, alumina felt, vermiculite, carbon fiber, silicon carbide fiber, and silica, or may contain at least one species of these as a main component. Preferably, the adjustment member 158 is formed of a stacking structure of thin plates (e.g., mica), since appropriate elasticity is imparted with respect to a load in a stacking direction.

Each cell unit 103 also includes an air supply unit 125, an air discharge unit 126, a fuel supply unit 127, and a fuel discharge unit 128. The air supply unit 125 includes the air supply path 104 for supplying air into the air chamber 116.

The air supply unit 125 includes an air supply through hole 129, an air supply communication chamber 130, a partition wall 131, an air supply communication portion 132, and the air supply path 104.

The air supply through hole 129 is provided so as to extend in a vertical direction at the center of one side of the quadrangular cell unit 103.

The air supply communication chamber 130 is an elongated-hole-shaped space which is provided in the cathode insulation frame 124 so as to communicate with the air supply through hole 129.

The partition wall 131 is provided between the air supply communication chamber 130 and the air chamber 116.

The air supply communication portion 132 is formed of a plurality of dents provided at regular intervals on the upper surface of the partition wall 131.

The air supply path 104 is inserted in the air supply through hole 129 for supplying air from the outside into the air supply communication chamber 130.

The air discharge unit 126 includes an air discharge through hole 133, an air discharge communication chamber 134, an air discharge communication portion 136, and the air discharge path 105.

The air discharge through hole 133 is provided so as to extend in a vertical direction at the center of the side of the cell unit 103 opposite the air supply unit 125.

The air discharge communication portion 136 is an elongated-hole-shaped space which is provided in the cathode insulation frame 124 so as to communicate with the air discharge through hole 133.

The air discharge communicating portion 136 is formed of a plurality of dents provided at regular intervals on the upper surface of a partition wall 135 between the air discharge communication chamber 134 and the air chamber 116.

The air discharge path 105 is a tubular path which is inserted in the air discharge through hole 133 for discharging air from the air discharge communication chamber 134 to the outside.

The fuel supply unit 127 includes a fuel supply through hole 137, a fuel supply communication chamber 138, a fuel supply communication portion 140, and the fuel supply path 106.

The fuel supply through hole 137 is provided so as to extend in a vertical direction at the center of one of the remaining two sides of the quadrangular cell unit 103.

The fuel supply communication chamber 138 is an elongated-hole-shaped space which is provided in the anode insulation frame 121 so as to communicate with the fuel supply through hole 137.

The fuel supply communication portion 140 is formed of a plurality of dents provided at regular intervals on the upper surface of a partition wall 139 between the fuel supply communication chamber 138 and the fuel chamber 117.

The fuel supply path 106 is a tubular path which is inserted in the fuel supply through hole 137 for supplying a fuel gas from the outside into the fuel supply communication chamber 138.

The fuel discharge unit 128 includes the fuel discharge path 107 for discharging a fuel gas from the fuel chamber 117 to the outside.

The fuel discharge unit 128 includes a fuel discharge through hole 141, a fuel discharge communication chamber 142, a partition wall 143, a fuel discharge communication portion 144, and the fuel discharge path 107.

The fuel discharge through hole 141 is provided so as to extend in a vertical direction at the center of the side of the cell unit 103 opposite the fuel supply unit 127.

The fuel discharge communication chamber 142 is an elongated-hole-shaped space which is provided in the anode insulation frame 121 so as to communicate with the fuel discharge through hole 141.

The partition wall 143 is provided between the fuel discharge communication chamber 142 and the fuel chamber 117.

The fuel discharge communication portion 144 is formed of a plurality of dents provided at regular intervals on the upper surface of the partition wall 143.

The fuel discharge path 107 is inserted in the fuel discharge through hole 141 for discharging the fuel gas from the fuel discharge communication chamber 142 to the outside.

The fuel cell stack 100 is produced by fixing, by means of the fixing members 109, a cell group prepared through stacking of a plurality of the aforementioned cell units 103.

When a plurality of the cell units 103 are stacked together, the upper interconnector 112 of the cell unit 103 located on the lower side is integrated with the lower interconnector 113 of the cell unit 103 located on the upper side of the lower-side cell unit 103, and the thus-integrated interconnector is shared by the upper and lower cell units 103, 103.

The fixing members 109 are a combination of a pair of end plates 145a and 145b and four clamping members 146a to 146d.

The paired end plates 145a and 145b vertically sandwich the cell group.

Each of the clamping members 146a to 146d for clamping the end plates 145a and 145b and the cell group includes a clamping nut and a bolt penetrating corner holes (not illustrated) of the end plates 145a and 145b and the aforementioned corner holes 147 of the cell group. The clamping members 146a to 146d are formed of, for example, Inconel 601.

The air supply path 104 is attached to the fuel cell stack 100 so as to vertically penetrate the through holes (not illustrated) of the end plates 145a and 145b and the air supply through holes 129 of the cell group.

(Modification)

Figure 10:
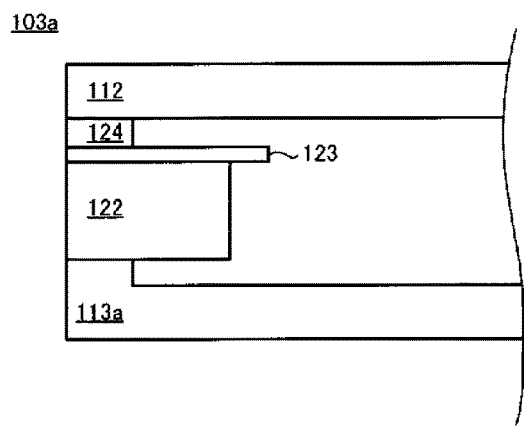
FIG. 10 is a schematic cross-sectional view of a cell unit 103a of a fuel cell stack according to a modification.

FIG. 10 is a schematic cross-sectional view of a portion of a cell unit 103a of a fuel cell stack according to a modification of the present invention.

The cell unit 103a includes interconnectors 112 and 113a, a cell frame 122, a separator 123, and a cathode insulation frame 124. Unlike the case of the aforementioned example, the cell unit 103a does not include an anode insulation frame 121. However, the interconnector 113a has a protrusion. Alternatively, the cell frame 122 may have a protrusion instead of providing the interconnector 113a with a protrusion. In this case, an increase in thickness of the interconnector 113a compensates for the protrusion of the interconnector 113a and the anode insulation frame 121.

Neither the interconnector 113a nor the cell frame 122 may have a protrusion, so long as the thickness of each of the members forming the cell unit 103a is adjusted.

Optionally, the interconnector 112, the cell frame 122, and the separator 123 may be bonded together through laser welding.

Description of, for example, a single cell 120, an air chamber 116, a fuel chamber 117, and connection members 118 and 119 is omitted.

As described above, the anode insulation frame 121 or the cathode insulation frame 124 may be omitted for the production of the fuel cell stack.

(Other Embodiments)

Embodiments of the present invention are not limited to those described above and may be expanded and modified. The thus-expanded and modified embodiments are also included in the technical scope of the present invention.

(1) Contact pressure may be controlled by adjusting the thickness of the connection member 118, rather than the thickness of the connection member 119.

(2) In the aforementioned embodiments, the frames (frame members (cell frame and separator), cathode insulation sealing member (cathode insulation frame), and anode insulation sealing member (anode insulation frame)) are provided between the interconnectors 112 and 113. A portion or the entirety of the frames may be integrated. Alternatively, the frames may be integrated with the interconnector 112 or 113.

In the fuel cell of the present invention, as described above in the embodiments, the connection member serves as a power collector which is provided separately from the interconnector. However, the present invention is not limited thereto. For example, the connection member may be a protruded power collector integrated with the interconnector. In this case, the connection member has a protrusion (i.e., a power collector integrated with the interconnector) which is electrically connected to the surface of the electrode (anode or cathode) of the single cell.

DESCRIPTION OF REFERENCE NUMERALS

100: fuel cell stack
102: electrolyte
103: cell unit
104: air supply path
105: air discharge path
106: fuel supply path
107: fuel discharge path
109: fixing member
112, 113: interconnector
114: cathode
115: anode
116: air chamber
117: fuel chamber
118, 119: connection member
120: single cell
121: anode insulation frame
122: cell frame
123: separator
124: cathode insulation frame
125: air supply unit
126: air discharge unit
127: fuel supply unit
128: fuel discharge unit
129: air supply through hole
130: air supply communication chamber
131: partition wall
132: air supply communication portion
133: air discharge through hole
134: air discharge communication chamber
135: partition wall
136: air discharge communication portion
137: fuel supply through hole
138: fuel supply communication chamber
139: partition wall
140: fuel supply communication portion
141: fuel discharge through hole
142: fuel discharge communication chamber
143: partition wall
144: fuel discharge communication portion
145a, 145b: end plate
146 (146a to 146d): clamping member
147: corner hole
157: power collector
157a: connector abutment portion
157b: single cell abutment portion
157c: communication portion
158: adjustment member
161: frame member
162: cathode insulation sealing member
163: anode insulation sealing member
195: spacer

The invention claimed is:

1. A fuel cell comprising:
a plurality of stacked cell units, each cell unit comprising at least:
an electrically conductive interconnector having a front surface and a back surface;
first and second connection members which are electrically connected to the electrically conductive interconnector;
a single cell which includes an anode, an electrolyte, and a cathode, and which is electrically connected to the first and second connection members, the electrolyte being provided between the anode and the cathode, the single cell being provided between the first and second connection members, the first connection member being provided on an anode side of the single cell, and the second connection member being provided on a cathode side of the single cell; and
a separator having an opening which is connected to an outer peripheral portion of the single cell, the cell units being clamped together in a stacking direction,
wherein the single cell of at least one cell unit has a different thickness from that of the single cell of another cell unit, and in the at least one cell unit where the single cell has the different thickness from that of the single cell of another cell unit (i) the first connection member has a thickness different from that of the first connection member of another cell unit; or (ii) the second connection member has a thickness different from that of the second connection member of the another cell unit so as to reduce contact resistance between the connection members and the single cell; and
wherein a relation of $0<(D2-D1)<200$ μm is satisfied, wherein D1 represents the shortest distance between the front surface of the electrically conductive interconnector of one cell unit and the back surface of the electrically conductive interconnector of another cell unit stacked on the one cell unit, and D2 represents the sum of the thickness of the first and second connection members of the one cell unit and the thickness of the single cell of the one cell unit.

2. The fuel cell according to claim 1, wherein a relation of $0<(D20-D10)<200$ μm is satisfied, wherein D10 represents a predetermined thickness corresponding to the distance between the front surface of the electrically conductive interconnector of one cell unit and the back surface of the electrically conductive interconnector of another cell unit stacked on the one cell unit, and D20 represents the sum of a predetermined thickness of the first and second connection members of the one cell unit and the thickness of the single cell of the one cell unit.

3. The fuel cell according to claim 1, wherein each of the first and second connection members is an electrically conductive power collector exhibiting elasticity.

4. The fuel cell according to claim 1, wherein each of the first and second connection members includes at least an insulative adjustment member and an electrically conductive current collector.

5. A fuel cell according to claim 1, wherein the first connection member is in contact with the anode of the single cell and the second connection member is in contact with the cathode of the single cell.

6. A fuel cell according to claim 1, which further comprises one or more frames which are provided between the electrically conductive interconnector of one cell unit and the electrically conductive interconnector of another cell unit stacked on the one cell unit.

7. A method for producing the fuel cell according to claim 1, the method comprising a step of stacking a plurality of cell units, each cell unit comprising at least:
- an electrically conductive interconnector having a front surface and a back surface;
- a connection member which is electrically connected to the interconnector;
- a single cell which includes an anode, an electrolyte, and a cathode, and which is electrically connected to the connection member; and
- a separator having an opening which is connected to an outer peripheral portion of the single cell, the method being characterized by comprising:
- a step of providing a plurality of connection members having different thicknesses;
- a step of measuring a thickness D23 of the single cell;
- a step of selecting, from among the connection members having different thicknesses, a connection member having a thickness corresponding to the difference obtained by subtracting the thickness D23 from a predetermined thickness D10 corresponding to the distance between the front surface of the interconnector of one cell unit and the back surface of the interconnector of another cell unit stacked on the one cell unit; and
- a step of stacking a cell unit including the selected connection member.

* * * * *